United States Patent
Gonzalez et al.

(10) Patent No.: US 11,732,898 B2
(45) Date of Patent: Aug. 22, 2023

(54) CONTENT VOLUME MEASUREMENT

(71) Applicant: Koninklijke Fabriek Inventum B.V., Nieuwegein (NL)

(72) Inventors: Arnau Castillo Gonzalez, Maarssen (NL); Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 206 days.

(21) Appl. No.: 17/129,794

(22) Filed: Dec. 21, 2020

(65) Prior Publication Data

US 2022/0196246 A1  Jun. 23, 2022

(51) Int. Cl.
*F24C 7/08* (2006.01)
*A21B 3/04* (2006.01)
*F24C 15/32* (2006.01)

(52) U.S. Cl.
CPC ............... *F24C 7/081* (2013.01); *A21B 3/04* (2013.01); *F24C 15/327* (2013.01)

(58) Field of Classification Search
CPC ........ F24C 7/085; F24C 15/327; F24C 7/081; A21B 3/04
See application file for complete search history.

(56) References Cited

U.S. PATENT DOCUMENTS

| 9,439,530 B2 | 9/2016 | Logan et al. |
| 2016/0061458 A1 | 3/2016 | van der Linden |
| 2016/0310077 A1 * | 10/2016 | Hunter ...................... A61F 2/32 |
| 2019/0234786 A1 * | 8/2019 | Klicpera .................. G01M 3/26 |
| 2019/0309955 A1 * | 10/2019 | Castillo ................. F24C 15/003 |

FOREIGN PATENT DOCUMENTS

| EP | 2154435 A2 | 2/2010 |
| EP | 2123981 B1 | 11/2010 |
| EP | 2468101 A1 | 6/2012 |
| EP | 3650758 A1 | 5/2020 |
| EP | 3677840 A2 | 7/2020 |
| JP | H06109252 A | 4/1994 |
| JP | 2014194325 A * | 10/2014 |
| JP | 5668774 B2 | 2/2015 |
| WO | WO-2018220571 A1 * | 12/2018 ............. B01L 3/508 |

OTHER PUBLICATIONS

Extended European Search Report issued by Examiner, of the European Patent Office, dated May 13, 2022, in corresponding European Patent Application No. 21215147.6.

* cited by examiner

*Primary Examiner* — Thien S Tran
(74) *Attorney, Agent, or Firm* — Locke Lord LLP; Daniel J. Fiorello; Gabrielle L. Gelozin

(57) ABSTRACT

A device can include an enclosure defining an interior having an enclosure volume and configured to hold one or more items, a heat system configured to heat the interior of the enclosure, a fluid system configured to input a known amount of a fluid (e.g., water, steam, air) into the enclosure, and a pressure sensor configured to sense a pressure within the enclosure. The device can include an item volume deduction module operatively connected to the pressure sensor and the fluid system. The item volume deduction module can be configured to correlate a pressure increase caused by injection of a known amount of the fluid (e.g., water, steam, air) in the enclosure to a total item volume of the one or more items within the enclosure.

18 Claims, 3 Drawing Sheets

CONTENT VOLUME MEASUREMENT

FIELD

This disclosure relates to devices having enclosed spaces for containing items (e.g., ovens).

BACKGROUND

Ovens, for example, on aircraft can be configured to hold and cook packaged meals. There is presently no way to determine how full an oven is without opening the oven and manually counting meals therein.

Such conventional methods and systems have generally been considered satisfactory for their intended purpose. However, there is still a need in the art for content volume measurement systems. The present disclosure provides a solution for this need.

SUMMARY

A device can include an enclosure defining an interior having an enclosure volume and configured to hold one or more items, a heat system configured to heat the interior of the enclosure, a fluid system configured to input a known amount of a fluid (e.g., water, steam, air) into the enclosure, and a pressure sensor configured to sense a pressure within the enclosure. The device can include an item volume deduction module operatively connected to the pressure sensor and the fluid system. The item volume deduction module can be configured to correlate a pressure increase caused by injection of a known amount of the fluid (e.g., water, steam, air) in the enclosure to a total item volume of the one or more items within the enclosure.

The item volume deduction module can be configured to output a total item volume value. The item volume deduction module can be configured to output a volume fraction of the item volume versus the enclosure volume to provide a fraction or percentage of volume occupied.

The volume fraction can be rounded to predetermined value of a plurality of predetermined values. The predetermined values can be halves, thirds, quarters, fifths, or tenths. Any suitable rounding is contemplated herein.

An item number module can be configured to correlate the total item volume to a number of items and/or a weight of items. The item data can include volume and/or weight per item such that the item number module divides the total item volume by the volume per item to output an item number and/or a weight. The item number can be rounded to a whole number.

In certain embodiments, the device can include a heating module configured to heat the interior of the enclosure based, directly or indirectly, on the total item volume. In certain embodiments, the enclosure is configured to be inserted into an aircraft galley.

In accordance with at least one aspect of this disclosure, an oven system can be configured to input a known amount of fluid (e.g., water, steam, air) into an oven enclosure and to determine a volume and/or number and/or weight of items in the enclosure by sensing a pressure increase in the enclosure after inputting the known amount of fluid (e.g., water, steam, air). In certain embodiments, the system can be configured to heat the interior of the enclosure as a function of the volume and/or number and/or weight of items in the enclosure.

In accordance with at least one aspect of this disclosure, a non-transitory computer readable medium comprising computer executable instructions configured to cause a computer perform a method. In certain embodiments, the method can include heating an interior of an oven to a first temperature, inputting a known amount of fluid (e.g., water, steam, air) into the interior of the oven to raise the pressure in the oven, determining the pressure rise due to the known amount of fluid (e.g., water, steam, air), and determining a volume and/or number and/or weight of items in the interior of the oven based on the pressure rise.

In certain embodiments, determining the pressure rise includes determining a peak pressure after inputting the known amount of fluid (e.g., water, steam, air). The method can include determining if there is a pressure leak based on a rate of pressure loss exceeding a threshold pressure loss rate.

Inputting the known amount of fluid (e.g., water, steam, air) can include sensing and/or metering an amount of liquid input. The method can further include cooking the items based on the determined volume and/or number and/or weight of the items in the interior of the oven. The method can include determining whether calcification of a fluid input has occurred by detecting whether peak pressure decreases over time.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
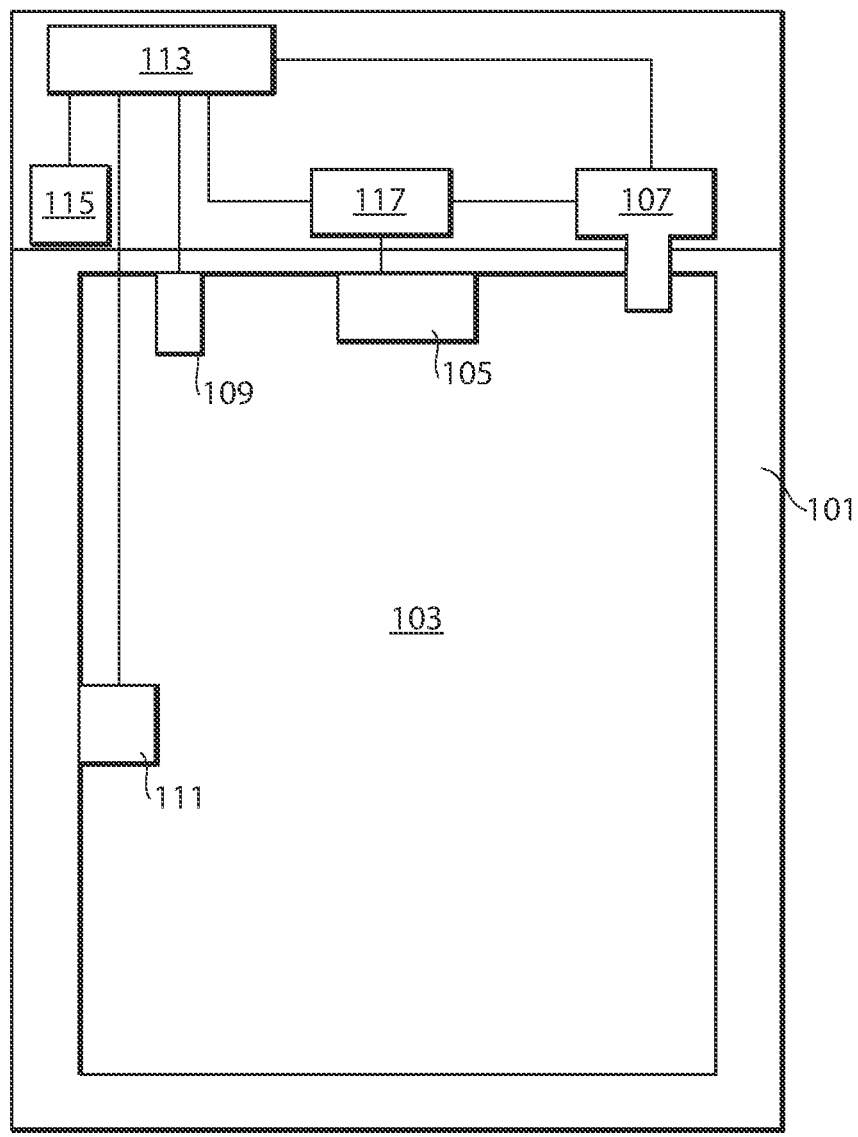
FIG. 1 is a schematic diagram of an embodiment of a device in accordance with this disclosure.
Figure 2A:
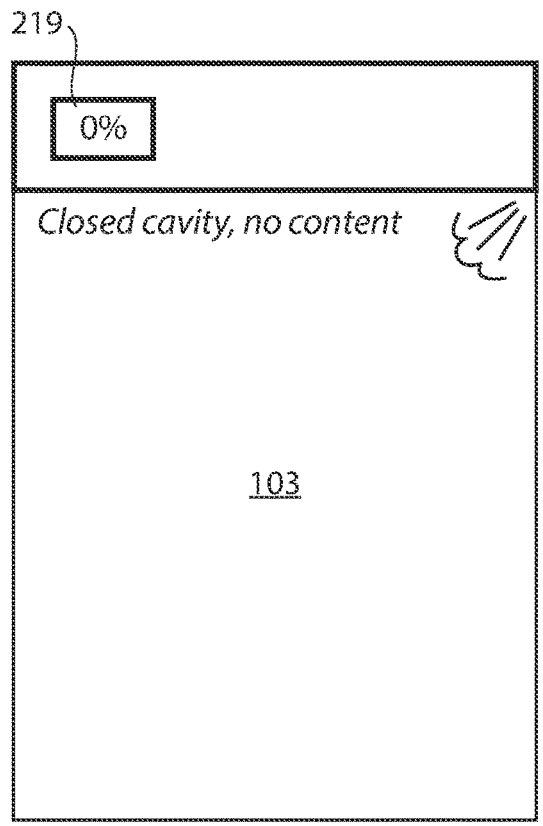
FIG. 2A illustrates an embodiment of a cavity (e.g., of the embodiment of FIG. 1), shown having no content therein.
Figure 2B:
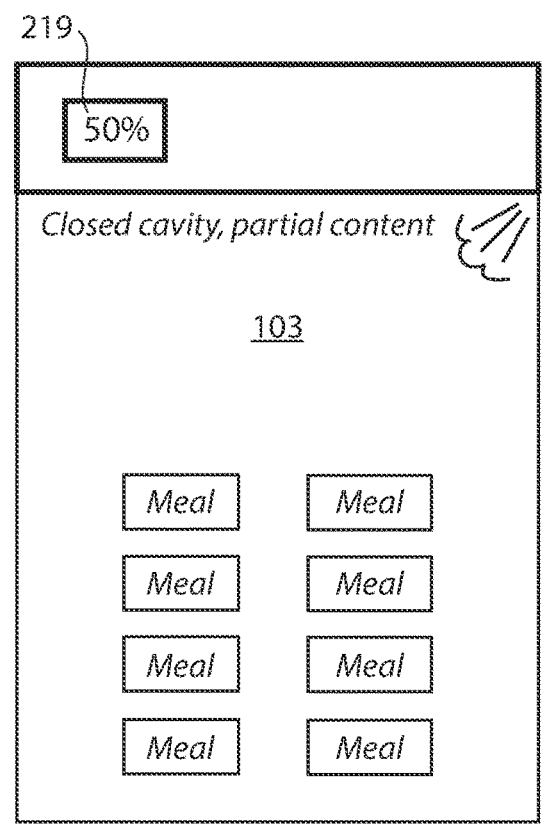
FIG. 2B illustrates an embodiment of a cavity (e.g., of the embodiment of FIG. 1), shown having partial content therein.
Figure 2C:
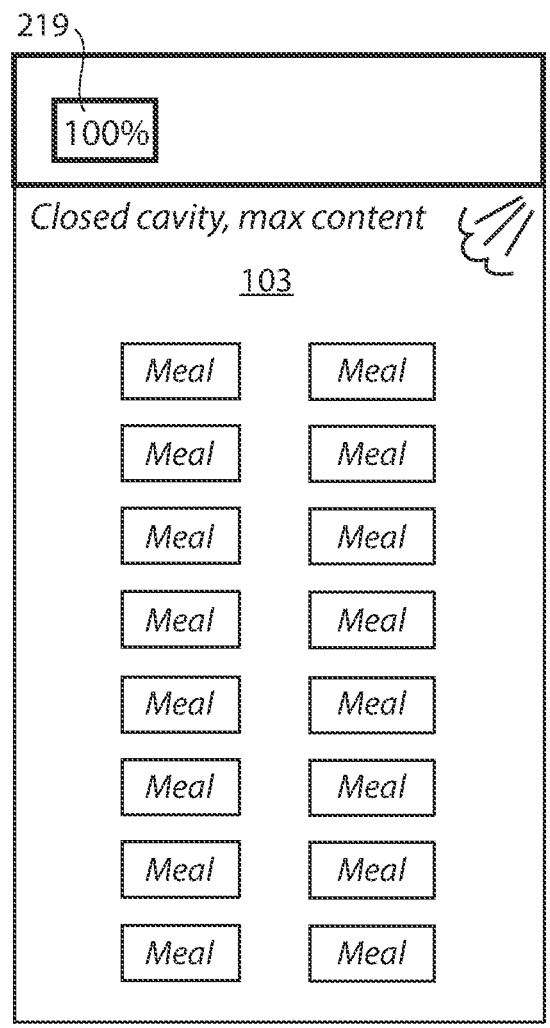
FIG. 2C illustrates an embodiment of a cavity (e.g., of the embodiment of FIG. 1), shown having maximum content therein.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2A-2C. Certain embodiments described herein can be used to determine an amount of items in a device, e.g., an oven.

Referring to FIG. 1, an embodiment of a device 100 having an embodiment of components in an embodiment of locations is shown. Any other suitable components and/or locations therefor are contemplated herein. A device 100 (e.g., an oven) can include an enclosure 101 (e.g., oven walls) defining an interior 103 having an enclosure volume and configured to hold one or more items (e.g., meals). The device 100 can include any suitable form and can be configured for any suitable use (e.g., shaped to be insertable in an aircraft galley to be used as an aircraft oven). The enclosure 101 can be configured to be substantially sealed to form a pressure vessel (e.g., for pressure cooking).

The device 100 can include a heat system 105 configured to heat the interior 103 of the enclosure 101. The heat system 105 can include any suitable heating elements (e.g., one or more oven heating elements such as one or more electric heaters at the bottom, sides, and/or top of the interior 103 of the enclosure), and/or any suitable heating mechanism.

The device 100 can include a fluid system 107 configured to input a known amount of a fluid (e.g., a liquid or gas, e.g., water, steam, and/or air) into the enclosure 101 (into the interior space 103). The fluid system 107 can include any suitable steam or liquid injection system for ovens, for example. In certain embodiments, the fluid system 107 can include a liquid pump for metering out fluid (e.g., water) to be injected. The fluid system 107 can include a suitable control module (not shown) for controlling the liquid pump for determining flow of liquid/steam into the interior 103. Any suitable fluid system 107 with suitable water pressure/flow measurement/control is contemplated herein (e.g., a fluid system for a pressure steam oven).

The device 100 can include a pressure sensor 109 configured to sense a pressure within the enclosure 101. Any other suitable sensors (e.g., one or more temperature sensors 111) are contemplated herein.

The device 100 can include an item volume deduction module 113 operatively connected to the pressure sensor 109 and the fluid system 107 (e.g., and the temperature sensor). The item volume deduction module 113 can be configured to correlate a pressure increase (e.g., at a sensed or assumed constant temperature) caused by injection of a known amount of the fluid (e.g., water, steam, air) in the enclosure 101 to a total item volume of the one or more items within the enclosure 101.

The item volume deduction module 103 can be configured to output a total item volume value. The item volume deduction module can be configured to output a volume fraction of the item volume versus the enclosure volume to provide a fraction or percentage of volume occupied.

The volume fraction can be rounded to predetermined value of a plurality of predetermined values. The plurality of predetermined values can be halves, thirds, quarters, fifths, or tenths. Any suitable rounding is contemplated herein.

An item number module 115 can be configured to correlate the total item volume to a number of items and/or a weight of items. The item data can include volume and/or weight per item such that the item number module divides the total item volume by the volume per item to output an item number and/or a weight. The item number can be rounded to a whole number (an integer). For example, the items can be one or more meals of a predetermined size and/or weight, and the item data can include this information.

In certain embodiments, the device 100 can include a heating module 117 operatively connected to the heating system 105 and configured to cause the heating system 105 to heat the interior 103 of the enclosure 101 based, directly or indirectly, on the total item volume (e.g., the number of items in the enclosure 101). For example, the heating module 117 can include one or more cooking settings selected based on the total item volume (e.g., the volume, weight, and/or number of meals in the enclosure).

In certain embodiments, the enclosure 101 can be configured to be inserted into an aircraft galley. Any other suitable form factor for any suitable use is contemplated herein.

Any modules disclosed (e.g., modules 113, 115, 117) can include any suitable hardware and/or software, and can be commonly hosted and/or separate in any suitable demarcation and/or grouping. For example, all modules can be software modules on a single controller in certain embodiments. In certain embodiments, one or more modules can be separate from one or more other modules.

Referring to FIGS. 2A, 2B, and 2C, an example is shown in three states. For example, as shown in FIG. 2A, the interior 103 can have no contents. In such a case, for example, an indicator 219 (e.g., displaying an output from module 113 and/or 115) can indicate that the interior 103 is empty (e.g., 0% as shown). As shown in FIG. 2B, the interior 103 can be partially filled. In such a case, for example, the indicator 219 can indicate that the interior 103 is partially filled (e.g., 50% as shown). As shown in FIG. 2C, the interior 103 can be completely filled. In such a case, for example, the indicator 219 can indicate that the interior 103 is completely filled (e.g., 100% as shown).

In accordance with at least one aspect of this disclosure, an oven system (e.g., module 113, fluid system 107, and pressure sensor 109) can be configured to input a known amount of fluid (e.g., water, steam, air) into an oven enclosure and to determine a volume and/or number and/or weight of items in the enclosure by sensing a pressure increase in the enclosure after inputting the known amount of fluid (e.g., water, steam, air). In certain embodiments, the system can be configured to heat the interior of the enclosure as a function of the volume and/or number and/or weight of items in the enclosure.

In accordance with at least one aspect of this disclosure, a non-transitory computer readable medium comprising computer executable instructions configured to cause a computer perform a method. In certain embodiments, the method can include heating an interior of an oven to a first temperature, inputting a known amount of fluid (e.g., water, steam, air) into the interior of the oven to raise the pressure in the oven, determining the pressure rise due to the known amount of fluid (e.g., water, steam, air), and determining a volume and/or number and/or weight of items in the interior of the oven based on the pressure rise.

In certain embodiments, determining the pressure rise includes determining a peak pressure after inputting the known amount of fluid (e.g., water, steam, air). The method can include determining if there is a pressure leak based on a rate of pressure loss exceeding a threshold pressure loss rate.

Inputting the known amount of fluid (e.g., water, steam, air) can include sensing and/or metering an amount of liquid input. The method can further include cooking the items based on the determined volume and/or number and/or weight of the items in the interior of the oven. The method can include determining whether calcification of a fluid input has occurred by detecting whether peak pressure decreases over time.

Embodiments enable determining content volume by using pressure. Certain embodiments can utilize existing pressure sensors (e.g., in certain pressurized steam ovens) in devices to determine volume of meals and/or approximate weight, and then change the cooking function based on the weight. Embodiments can make a general assumption that each meal has a known volume and an assumed weight. Certain embodiments can be utilized with a software update to existing oven controllers, for example (e.g., modules disclosed above being installed as software modules on existing hardware). The assumed volumes and weights can be customized for each user and/or different meal types.

When a fixed amount of water is evaporated in an enclosed space of a known temperature, a certain pressure increase results, which can be calculated. The gas laws define, that injecting the same amount of water (at the same space temperature) in a smaller volume will cause the pressure to be higher. This effect can also be reversed: By controlling the injected water quantity and by measuring the pressure and temperature, one can estimate the available volume in the oven cavity. Because the inner cavity has known dimensions, the estimated volume of the content placed inside the oven cavity can be derived.

In certain embodiments, knowing the content volume can be used to roughly estimate if an oven is fully or partially loaded (100%, 75%, 50%, 25%, etc.), which allows adjusting the cooking program to the loaded content. When a customer always uses a specific type of item (e.g., a sealed casserole) it may even be possible to estimate the amount of loaded meals.

For example, an inner oven can have a volume of about 45.7 l (e.g., 430×425×25 cm). A typical casserole could have a volume of about 300 ml (e.g. 15×5×4 cm). So when 32 casseroles are inserted in the oven, the remaining volume goes down to 36.1 l. This is a decrease of about 21%, so assuming that the volume of gas and the temperature remain the same, the pressure will increase by the same ratio.

An example measurement procedure can be: (1) pre heat the oven content with a (short duration) dry heat program, (2) close the oven cavity, (3) inject water and measure the peak pressure, repeat if necessary or desired (amount of water injected can be always the same), (4) determine content volume based on pressure increase, and (5) adjust the cooking program and start steam cooking cycle Since the volume detection depends on the pressure measurement, a pressure leak may distort the measurements. A leak however can be detected by the rate of pressure drop after the first peak, while for the volume detection the peak itself is more interesting. Therefore a leak should not impose a problem, and can even be detected and reported in certain embodiments.

Cooking program variables (time/temp/pressure/humidity) can be known step changes based on set levels of volume usage (25%, 50%, 75%, 100%). These estimates of volume usage can be practical in scenarios where there are many variables, so results can be fit to the set levels to make estimation easier and simpler. Certain embodiments can use exact numbers and a map as opposed to broader buckets, for example. Embodiments can display the estimated volume amount on a display (e.g., a control interface or touchscreen).

Embodiments can also be configured to determine if the items in the cavity are sealed, e.g., by means of measuring the humidity. In certain embodiments, the volume and the weight can be used to determine an average density of the content, and this way, an estimate can be done on the type of meal (chicken, fish, mashed potatoes, etc.) and thus further tune the cooking program to the content.

Certain embodiments can also be used in reliability predictions. If an oven is always loaded in the same way, with the same casseroles, the pressure build up inside the oven should be consistent. If the peak pressure decreases over time, than this can suggest a decrease in injected water, which could suggest calcification of the water injection nozzle. Such a fault could be determined and reported (e.g., to the display).

Embodiments can provide more details of the loaded content of an oven, allowing optimized cooking programs and thus better meals, for example. Traditional systems simply assume a full oven. Any other suitable uses and advantages are contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A device, comprising:
   an enclosure defining an interior having an enclosure volume and configured to hold one or more items;
   a heat system configured to heat the interior of the enclosure;
   a fluid system configured to input a known amount of a fluid into the enclosure;
   a pressure sensor configured to sense a pressure within the enclosure;
   an item volume deduction module operatively connected to the pressure sensor and the fluid system, the item volume deduction module configured to correlate a pressure increase caused by injection of a known amount of the fluid in the enclosure to a total item volume of the one or more items within the enclosure; and
   an item number module configured to correlate the total item volume to a number of items in the enclosure.

2. The device of claim 1, wherein the item volume deduction module is configured to output a total item volume value.

3. The device of claim 1, wherein the item volume deduction module is configured to output a volume fraction of the item volume versus the enclosure volume to provide a fraction or percentage of volume occupied.

4. The device of claim 3, wherein the volume fraction is rounded to predetermined value of a plurality of predetermined values.

5. The device of claim 4, wherein the predetermined values are halves, thirds, quarters, fifths, or tenths.

6. The device of claim 1, wherein the item number module is further configured to correlate the total item volume to a weight of items.

7. The device of claim 6, wherein the item data includes volume and/or weight per item such that the item number module divides the total item volume by the volume per item to output an item number and/or a weight.

8. The device of claim 7, wherein the item number is rounded to a whole number.

9. The device of claim 1, further comprising a heating module configured to heat the interior of the enclosure based, directly or indirectly, on the total item volume.

10. The device of claim 9, wherein the enclosure is configured to be inserted into an aircraft galley.

11. An oven system configured to input a known amount of fluid into an oven enclosure and to determine a number and volume and/or weight of items in the enclosure by sensing a pressure increase in the enclosure after inputting the known amount of fluid.

12. The oven system of claim 11, further configured to heat the interior of the enclosure as a function of the number and volume and/or weight of items in the enclosure.

13. A non-transitory computer readable medium comprising computer executable instructions configured to cause a computer perform a method, the method comprising:

heating an interior of an oven to a first temperature;
inputting a known amount of fluid into the interior of the oven to raise the pressure in the oven;
determining the pressure rise due to the known amount of fluid; and
determining a number and volume and/or weight of items in the interior of the oven based on the pressure rise.

14. The medium of claim 13, wherein determining the pressure rise includes determining a peak pressure after inputting the known amount of fluid.

15. The medium of claim 14, wherein the method further includes determining if there is a pressure leak based on a rate of pressure loss exceeding a threshold pressure loss rate.

16. The medium of claim 13, wherein inputting the known amount of fluid includes sensing and/or metering an amount of liquid input.

17. The medium of claim 13, wherein the method further includes cooking the items based on the determined number and volume and/or weight of the items in the interior of the oven.

18. The medium of claim 16, wherein the method includes determining whether calcification of a fluid input has occurred by detecting whether peak pressure decreases over time.

* * * * *